United States Patent [19]
Kibler et al.

[11] 3,878,921
[45] Apr. 22, 1975

[54] BICYCLE BRAKE

[75] Inventors: Robert L. Kibler, Saint Joseph; Daniel C. Brant, Watervliet, both of Mich.

[73] Assignee: Lambert Brake Corporation, St. Joseph, Mich.

[22] Filed: Feb. 7, 1974

[21] Appl. No.: 440,378

[52] U.S. Cl. ................................ 188/26; 188/72.7
[51] Int. Cl. ............................................. B62l 1/00
[58] Field of Search ............ 188/26, 72.7, 72.9, .6, 188/73.3

[56] References Cited
UNITED STATES PATENTS

| | | | |
|---|---|---|---|
| 2,612,968 | 10/1952 | Hood | 188/26 |
| 3,243,016 | 3/1966 | Swift | 188/72.7 X |
| 3,292,739 | 12/1966 | Ulbing | 188/72.7 X |
| 3,373,845 | 3/1968 | Campagnolo | 188/26 |
| 3,392,809 | 7/1968 | Hodkinson et al. | 188/73.3 X |
| 3,638,763 | 2/1972 | Laverdant | 188/72.7 X |
| 3,765,511 | 10/1973 | Toyomasu | 188/72.7 |

Primary Examiner—George E. A. Halvosa
Attorney, Agent, or Firm—Olson, Trexler, Wolters, Bushnell & Fosse

[57] ABSTRACT

A disc brake for use with bicycles and like vehicles is disclosed. A brake disc is retarded in its rotational motion by brake pads mounted on opposite sides of the disc in a two-part housing which surrounds, at one spot, the disc periphery. A spindle-like actuator is mounted within a primary housing part for rotational and limited axial motion to force one brake pad into contact with an adjacent brake disc side. The housing is mounted for limited motion relative to the vehicle frame, and when the first brake pad engages the disc, a second brake pad oppositely mounted on the housing is pulled into engagement with the opposite disc side.

2 Claims, 11 Drawing Figures

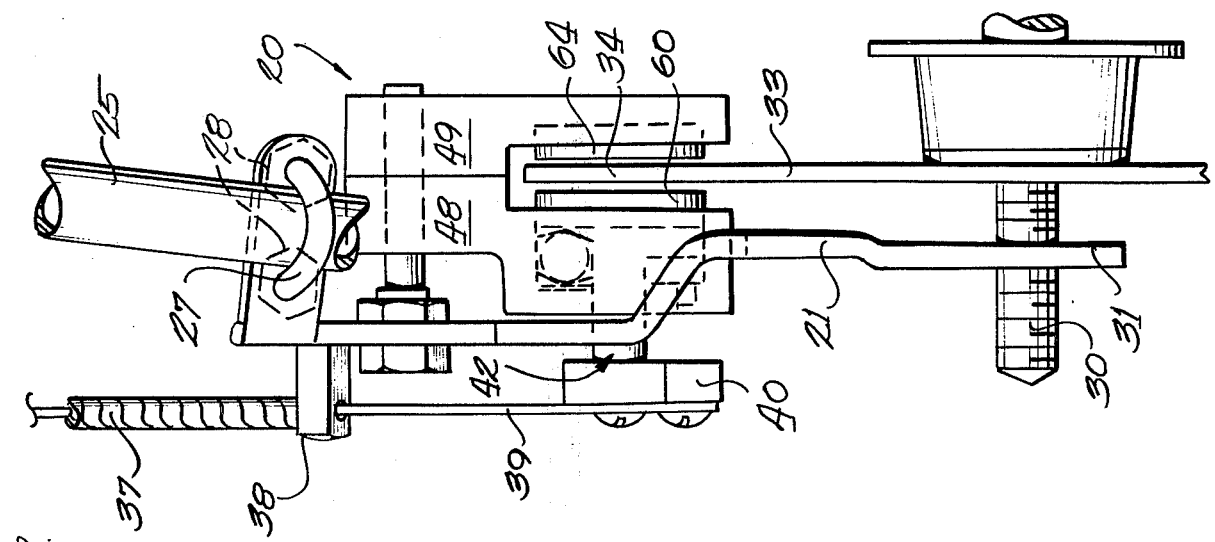
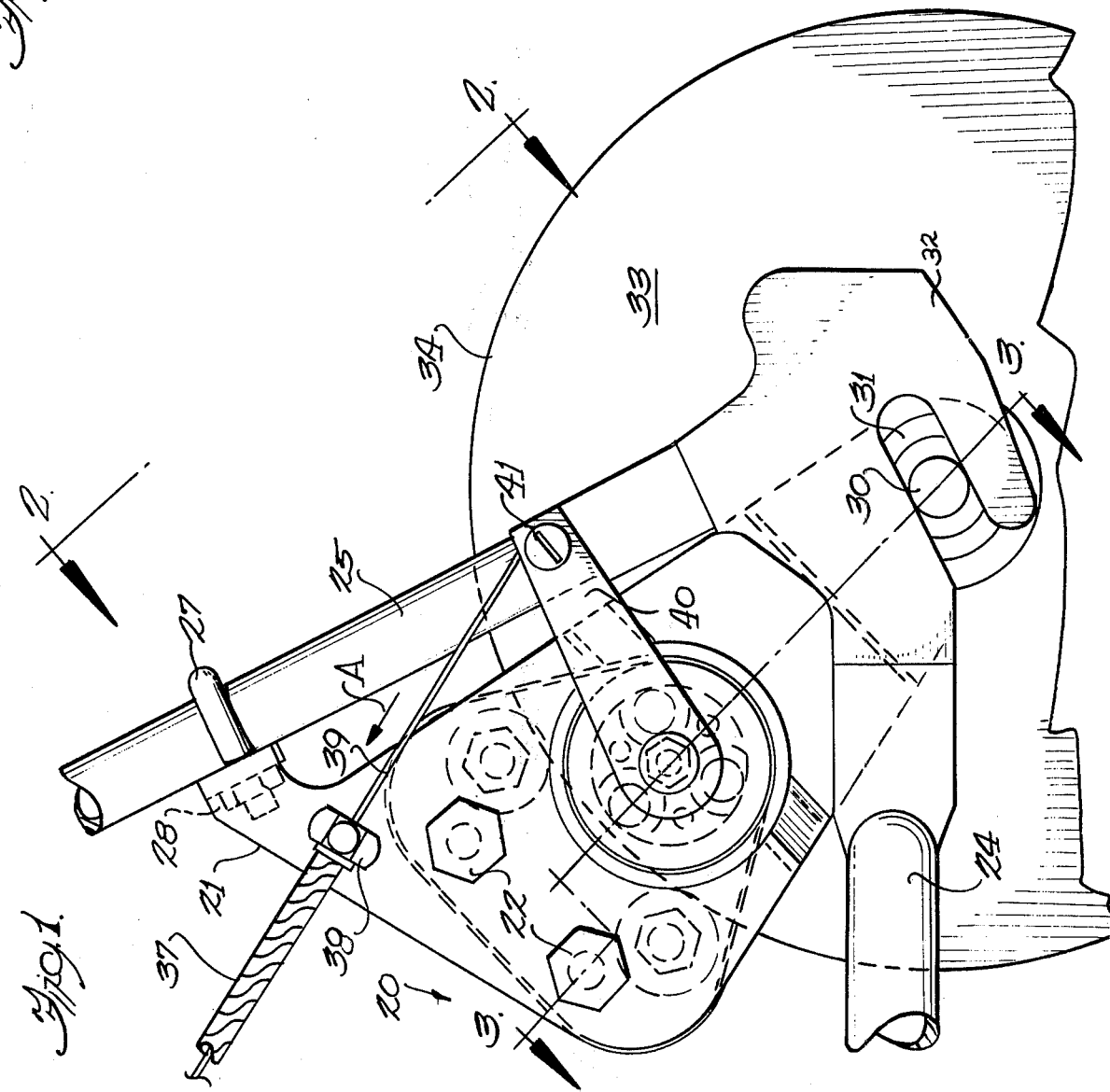

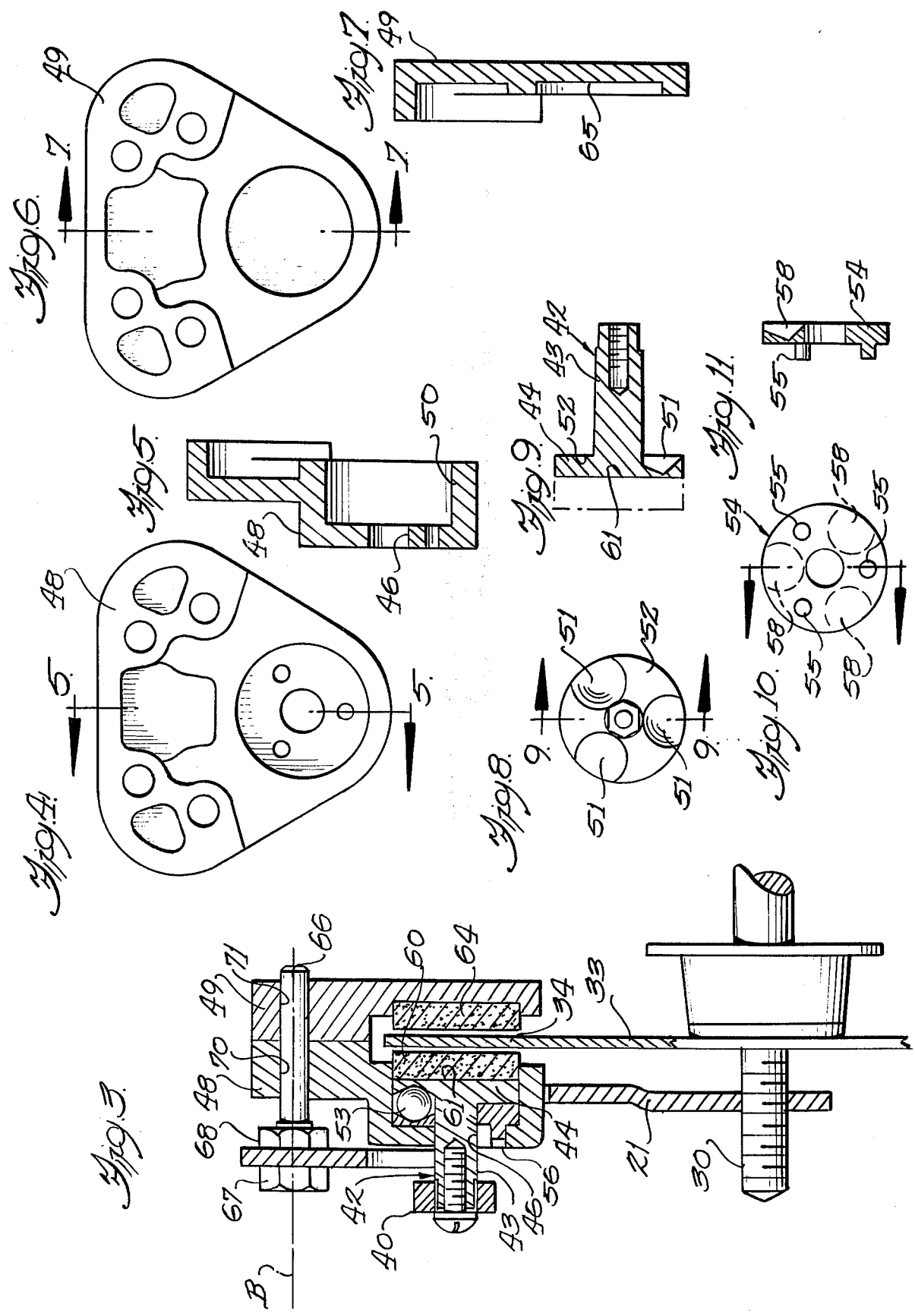

BICYCLE BRAKE

BACKGROUND OF THE INVENTION

This invention relates generally to brakes, and more particularly concerns bicycle disc brakes.

It is the general object of the invention to provide a disc brake especially adapted for use with bicycles and like vehicles which is of rugged design, simple construction, and long service life.

It is another object to provide a bicycle disc brake which is compact, and which can be easily mounted upon bicycles of the usual construction.

Still another object is to provide a bicycle disc brake which is self-energizing.

Yet another object of the invention is to provide a bicycle disc brake which is self centering. A related object is to provide a bicycle disc brake which applies equal braking force to both sides of a bi-sided brake disc. Still another related object is to provide a bicycle disc brake which operates effectively regardless of slight undulations in the motion of the brake disc.

Other objects and advantages of the invention will become apparent upon reading the following detailed description and upon reference to the drawings. Throughout the description, like reference numerals refer to like parts.

BRIEF DESCRIPTION OF THE DRAWINGS

FIG. 1 is a fragmentary elevational view showing the novel bicycle disc brake as it appears when mounted upon a portion of the bicycle frame;

FIG. 2 is an end elevational view taken substantially in the plane of line 2—2 in FIG. 1;

FIG. 3 is a sectional view taken substantially in the plane of line 3—3 in FIG. 1;

FIG. 4 is an elevational view showing in further detail a brake housing part;

FIG. 5 is a sectional view taken substantially in the plane of line 5—5 in FIG. 4;

FIG. 6 is an elevational view showing another brake housing part;

FIG. 7 is a sectional view taken substantially in the plane of line 7—7 in FIG. 6;

FIG. 8 is an elevational view showing a brake actuator member;

FIG. 9 is a sectional view taken substantially in the plane of line 9—9 in FIG. 8;

FIG. 10 is an elevational view of a brake backup plate; and

FIG. 11 is a sectional view taken substantially in the plane of line 11—11 in FIG. 10.

DETAILED DESCRIPTION

While the invention will be described in connection with a preferred embodiment, it will be understood that it is not intended to limit the invention to that embodiment. On the contrary, it is intended to cover all alternatives, modifications and equivalents as may be included within the spirit and scope of the invention.

Turning first to FIGS. 1 and 2, there is shown the novel bracke 20 of the present invention. In accordance with one aspect of the invention, this compact brake 20 is adapted to be quickly and easily mounted upon a bicycle frame. To that end, a brake mounting plate 21 is attached, as by bolts 22, to the brake structure 20, and to a bicycle frame which here includes a relatively horizontal strut 24 and an inclined strut 25. Attachment to the inclined strut 25 is accomplished by a U-shaped bolt 27 and appropriate nuts 28, and attachment to an axle 30 is accomplished by a hook member 31. It will be noted that the bicycle frame members 24 and 25 are attached to the axle 30 by a similar hook device 32.

Mounted on the axle 30 is a disc 33 which rotates with the rear wheel of the bicycle (not shown) or a similar vehicle part. In accordance with another aspect of the invention, the simple and inexpensive brake structure 20 is adapted to engage the periphery 34 of this disc 33 at a given spot or location, and retard the disc rotational motion. Brake actuation is accomplished by a Bowden cable having a relatively stationary sheath 37 which terminates in a nut 38 affixed to the fixed mounting plate 21, and a relatively movable cable 39 carried within the sheat 37. Actuation of a remote brake energizer, such as a brake handle mounted upon a bicycle handle bar (not shown) causes the cable 39 to move in the general direction of the arrow A. As can be seen in FIG. 1, the end of the cable 39 is attached to a small lever 40 by any convenient means such as an attachment screw 41. Actuation of the brake energizer and the cable 39 cause the lever 40 to rotate counterclockwise, as seen in FIG. 1.

Pivotal motion of the lever 40 moves a spindle-like actuator member 42 comprising a shaft 43 and an attached plate 44, as will be further explained below. To connect with the lever 40, the shaft 43 of the actuator 42 protrudes through an aperture 46 formed in a primary housing 48. This primary housing member, together with a secondary housing member 49, comprise the brake housing which surrounds only the periphery 34 of the disc 33. To mount the actuator plate 44 and associated parts for limited axial motion, a well 50 is formed in the primary housing 48.

Surrounding the actuator shaft 42 are a plurality of inclined, generally spheroidal surfaces 51 formed on one side 52 of the actuator plate 44. These surfaces 51 loosely engage a corresponding plurality of balls 53 which are trapped between the primary housing 48 and the plate grooves 51. In the illustrated embodiment, a backup plate 54 is mounted in the primary housing well 50, as by pins 55 formed for insertion into mating primary housing bores 56. In the backup plate 54, spheroidal surfaces 58 are formed and arrayed to generally oppose the spheroidal surfaces 51 formed in the first surface 52 of the actuator plate 44. Now, as the actuator shaft 43 rotates the actuator plate 44, the balls 53 force the plate 44 to undergo a limited helical movement, or combined rotational and axial motion, inside the primary housing 48. This limited axial motion of the actuator plate 44 (to the right, as shown in FIG. 3) forces a first brake pad 60, mounted directly to an opposite side 61 of the actuator plate 44, into engagement with one side of the brake disc periphery 34.

In accordance with another aspect of the invention, a second brake pad 64 is fixedly mounted on a seat 65 formed in the secondary housing 49 for engaging the disc 33 on the side opposite the first brake pad 60. To this end, the two-part braking housing 48 and 49 is not rigidly affixed to the housing mounting plate 21, but is mounted for limited motion relative thereto in a direction generally parallel to the axis 30 of the brake disc 33. This movable mounting is accomppished by pins 66 which are fixed, as by pin heads 67 and backup nuts 68, to the brake mounting plate 21. The axes B of these pins 66 are oriented generally parallel to the brake disc axle 30, and the pins themselves loosely engage apertures 70 and 71 formed in the respective housings 48 and 49. Thus, the housings 48 and 49 can undergo limited motion in a direction generally parallel to the axle 30 and the pin axis B.

When the first brake pad 60 is forced to the right, as shown in FIG. 3, to engage the brake disc 33 as described above, an equal and opposite reaction forces the entire two-part housing 48 amd 49 to undergo motion to the left, relative to the frame members 24 and 25, thereby drawing the second brake pad 64 into engagement with the brake disc 33, and squeezing the disc 33 between the pads 60 and 64 to retard disc rotation.

The invention is claimed as follows:

1. A disc brake for retarding the rotative motion of a bi-sided disc about an axle journaled upon a vehicle frame, comprising a brake attachment plate rigidly affixed to the vehicle frame at a plurality of points, and including plate hook means hooked over the disc axle, a plurality of smooth-surfaced axially elongated cylindrical moutning pins rigidly affixed to the brake attachment plate and having their axes oriented parallel to the disc axle, a brake housing adapted to surround the disc periphery at one spot and provided with smooth-surfaced housing apertures formed to mate with the housing pins, the housing being adapted to slide over the mounting pins for a limited distance in a direction parallel to the disc axle, a brake actuator back-up plate provided with spheroidally surfaced grooves having their centers of depression spaced from the actuator back-up plate periphery, a plurality of back-up plate mounting pins formed on the brake actuator back-up plate for engagement with mating pin recesses formed in the brake housing, a brake actuator plate provided with spheroidally surfaced grooves having their centers of depression spaced from the actuator plate periphery and normally arrayed in confronting relationship with the actuator back-up plate spheroidal grooves, actuator plate rotating means, a plurality of movable balls trapped between the actuator back-up plate spheroidal grooves and the actuator plate spheroidal grooves at positions spaced apart from each other, from the hhousing, from the actuator plate periphery, and from the actuator back-up plate periphery for causing the actuator plate to move axially as well as rotationally when the actuator plate rotating means is energized, a first brake pad rigidly affixed to the brake actuator plate and positioned to engage the disk upon appropriate axial motion of the back-up plate, and a second brake pad rigidly affixed to said housing on the opposite side of said brake disc and in opposing relationship to said first brake pad, said rotatable disc being squeezed between the first and second brake pads to retard disc rotation upon energization of said actuator plate rotating means.

2. A disc brake according to claim 1 wherein said actuator plate rotating means includes a shaft affixed to the plate, a lever extending radially from the shaft, and remotely energizable cable means connected to the lever for rotating the lever and the shaft.

* * * * *